Jan. 28, 1947.    J. M. WEED    2,414,990
ELECTRICAL INDUCTION APPARATUS
Filed Dec. 29, 1943    4 Sheets-Sheet 1
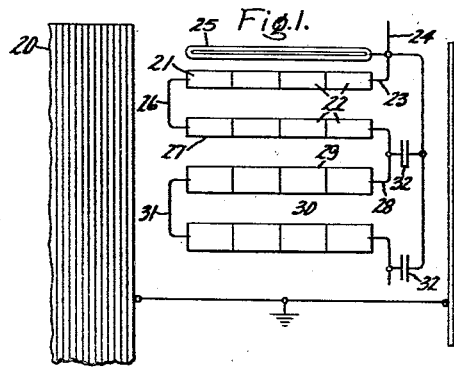
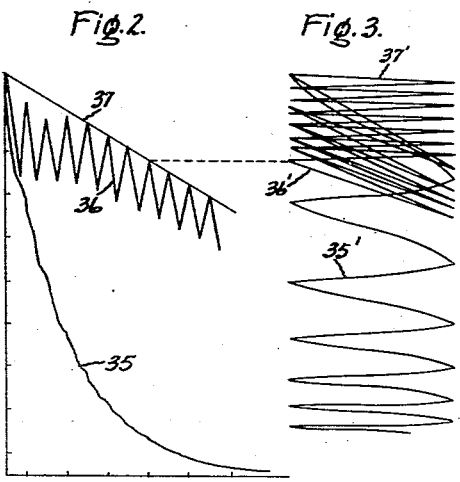
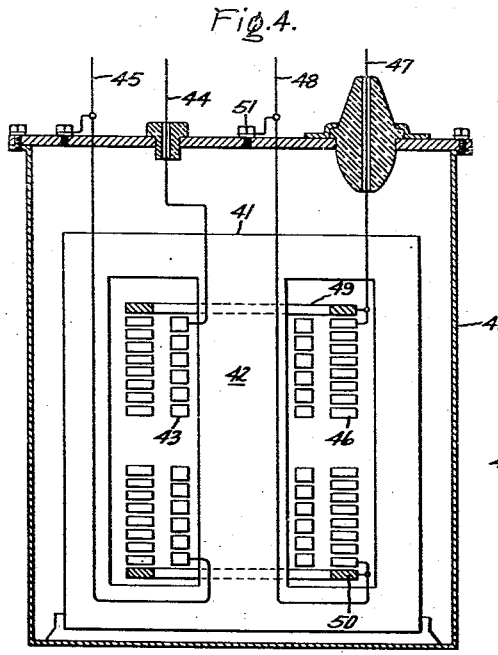
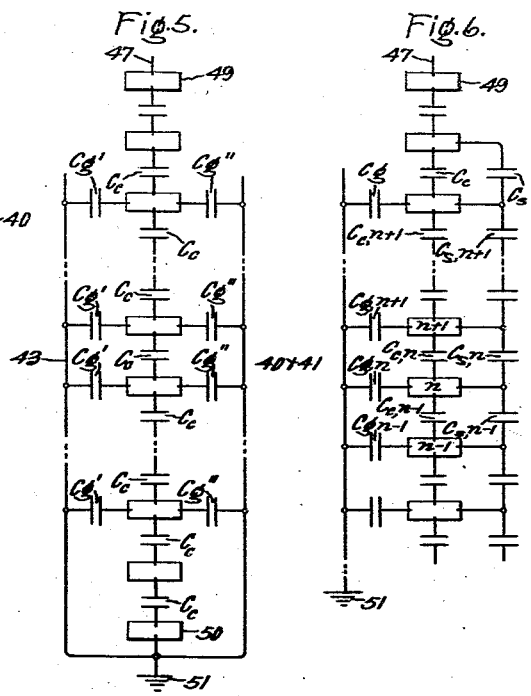
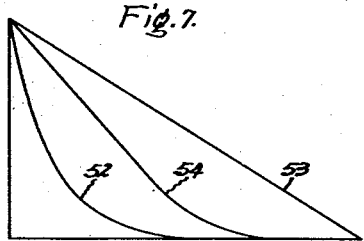
Inventor:
James M. Weed,
by Harry E. Dunham
His Attorney.

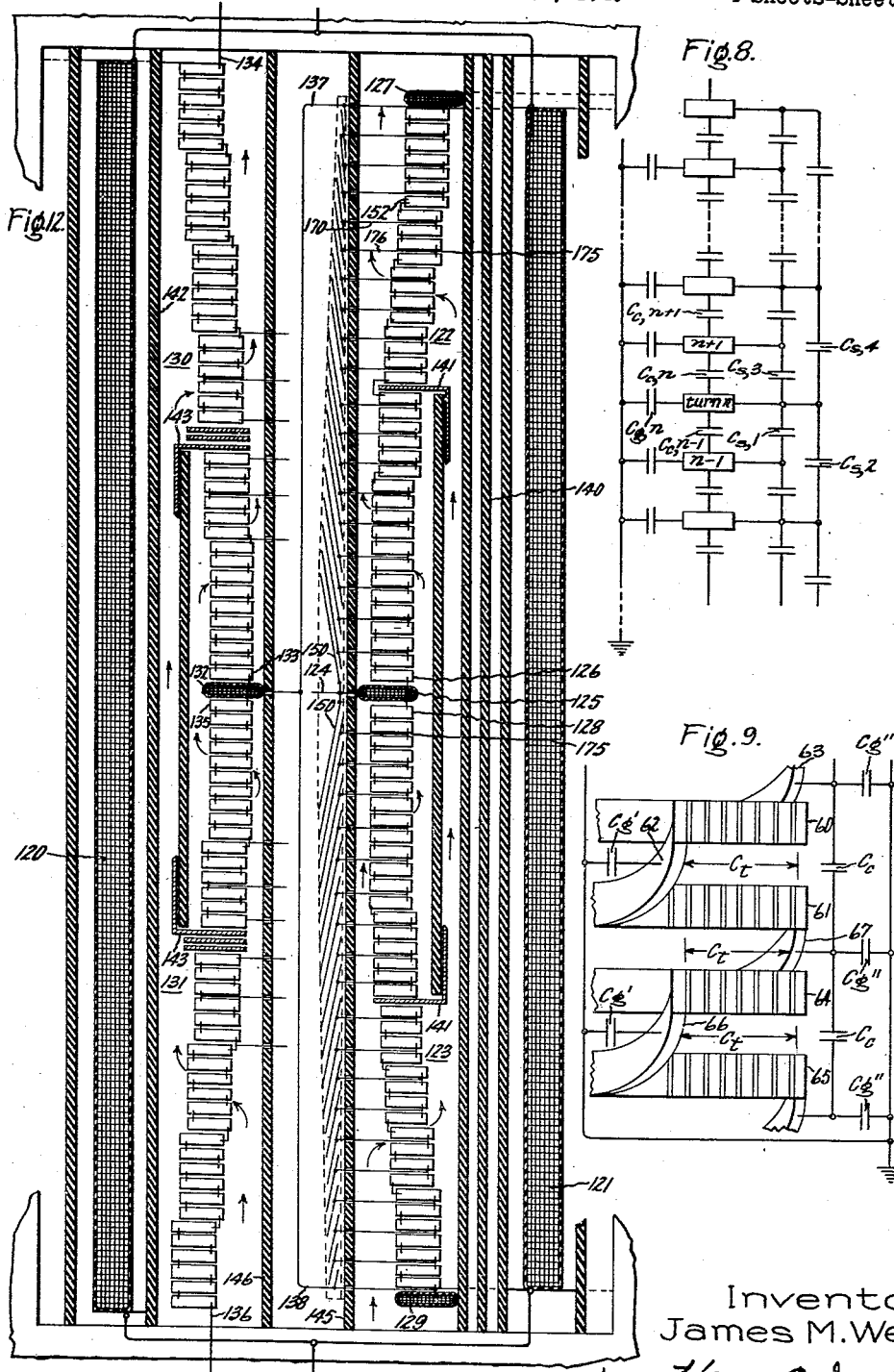

Jan. 28, 1947.    J. M. WEED    2,414,990
ELECTRICAL INDUCTION APPARATUS
Filed Dec. 29, 1943    4 Sheets-Sheet 3
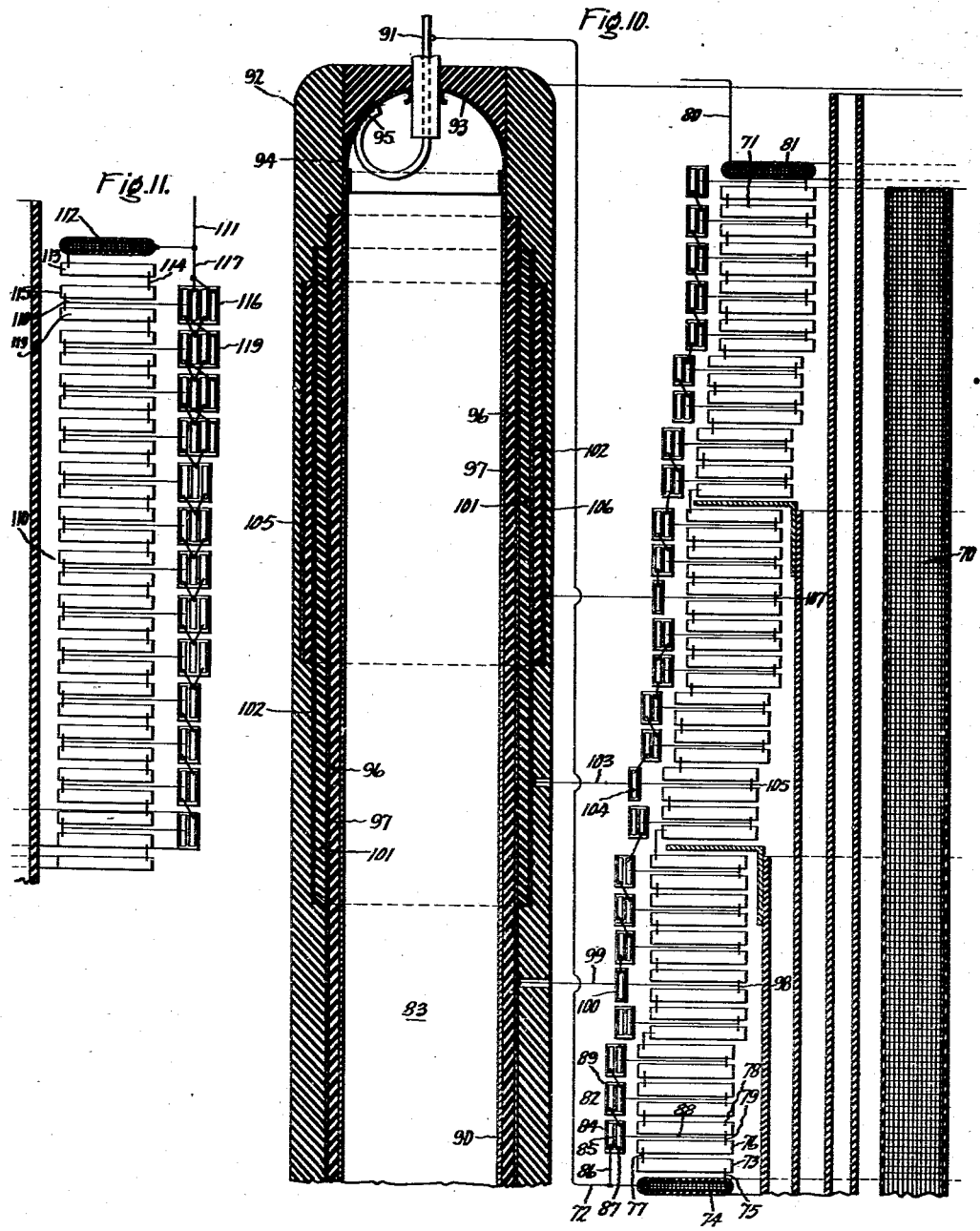
Inventor:
James M. Weed,
by Harry E. Dunham
His Attorney.

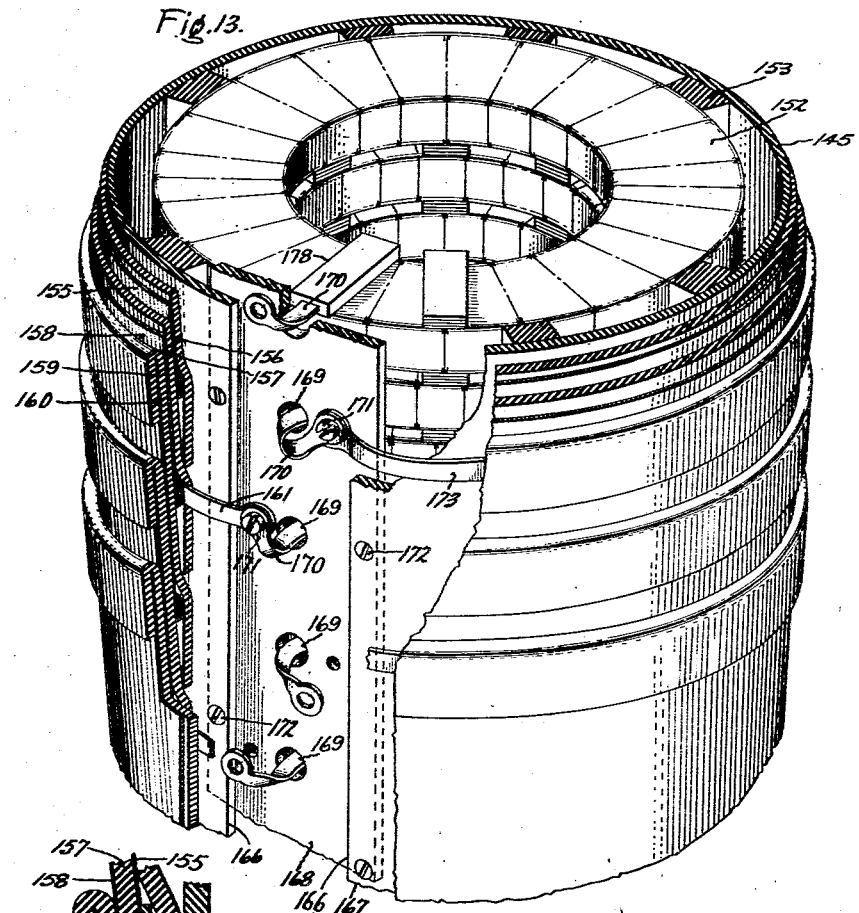
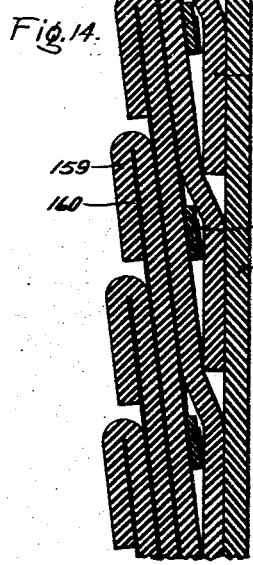
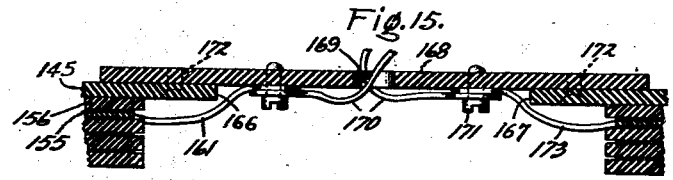
Inventor:
James M. Weed,
by Harry E. Dunham
His Attorney.

Patented Jan. 28, 1947

2,414,990

UNITED STATES PATENT OFFICE 2,414,990

ELECTRICAL INDUCTION APPARATUS

James M. Weed, Syracuse, N. Y., assignor to General Electric Company, a corporation of New York Application December 29, 1943, Serial No. 516,070

23 Claims. (Cl. 175—356)

My invention relates to electrical induction apparatus, such as transformers and reactors, and to an arrangement of capacitance for shielding the windings of such apparatus.

It is customary to shield the windings of such apparatus as transformers and reactors, which are subject to impulse voltages during operation, to prevent excessive parts of the voltage from appearing between turns or between coils.

An object of my invention is to provide an improved shielding arrangement for distributing any suddenly impressed voltage in a winding of such apparatus as transformers and reactors.

The general principles underlying arrangements for giving substantially uniform or linear distribution of impulse voltages in windings are stated in my U. S. Patent 1,585,448, issued May 8, 1926, which describes various arrangements for carrying out these principles. Various other arrangements for shielding a number of types of commonly used windings are disclosed in the following U. S. Patents: 1,511,717 issued to Blume et al., on October 14, 1924; 1,741,200 issued to K. K. Paluev, on March 5, 1929; 2,279,027 issued to Weed et al., on April 7, 1942; 2,279,028 issued to Weed, on April 7, 1942, all assigned to the same assignee as the present invention. The arrangements disclosed in all of these patents are commonly called shields.

As set forth in my Patent 1,585,448, when an impulse such as those produced by lightning or switching is impressed at the terminal of a winding, if the initial voltage gradient within the winding is the same as the final gradient, no internal oscillations will be produced, and the voltage distribution will be at all times uniform. Since the initial gradient is effected by capacitance alone, and the final gradient by inductance, this result is secured by a suitable arrangement of capacitance so that the initial voltage will be uniformly distributed along the winding.

Unshielded windings of electrical induction apparatus have inherent capacitance between parts of the winding, and from the winding to ground, so distributed that excessive portions of the initial voltage appear across small parts of the winding, as between adjacent coils or turns. These initial excess voltages are heavily concentrated near the terminal where the impulse is impressed. Oscillations usually result which would not appear if the initial gradient were uniform, and such oscillations produce dangerous voltages in other parts of the winding. These initial voltage concentrations and resulting oscillations may be reduced by shielding, the shields supplying capacitance elements from the line terminal or from points in the winding which are of higher potential than the points shielded. These capacitance elements may be called corrective capacitance.

A type of winding which has common application in transformers and with which electrostatic shielding has found extensive application is the solenoidal winding which has considerable radial thickness, comprising stacks of serially connected disk or "pancake" sections. Usually these sections occur in pairs, wound in opposite directions from the inside out, and connected start-to-start. The start-to-start connections are ordinarily called inside crossovers, and the pair of sections thus connected is called a double section coil. These double section coils are frequently designated merely as coils, and such coils are connected finish-to-finish to form the winding. The finish-to-finish connections are called outside crossovers.

When such windings are shielded according to prior arrangements, I have found that even though the voltage distribution along the outer surface of the winding may be reasonably linear, giving a substantially uniform coil-to-coil voltage distribution, the gradients within individual coils may be steep, resulting in high voltages between turns. As will be described more fully hereinafter, the turn-to-turn gradient is serrated, with steep positive segments in alternate sections and somewhat less steep negative segments in the intermediate sections. Each serration will correspond to a single coil. Furthermore, producing a substantially linear voltage distribution along the outer surface of such a winding by conventional shielding arrangements may even be at the expense of accentuating such a non-uniform voltage gradient within individual coil sections of the winding so that high voltages may thus be produced between adjacent turns in the section, even though the distribution with respect to corresponding points in the coils may be satisfactory. Moreover, when the thickness of the turn insulation is increased, the depths of the serrations become greater, with consequent increase in the voltages between the turns which may be but little less than the increased strength of the insulation. If the safety factor of turn or layer insulation is low, thickening the insulation as has been practiced in the past is, for this reason, a very inefficient method of raising it.

A more specific object of my invention, therefore, is to provide an improved shielding arrangement for substantially eliminating the voltage serrations in double section coil windings.

A further object of my invention is to provide an improved shielding arrangement for producing sufficient corrective capacitance to reduce the initial coil-to-coil voltage gradient as much as may be desired near the terminal, as well as throughout the remaining part of the winding.

Although the ideal distribution of initial voltage in windings is linear, or uniform throughout the winding, this result can be obtained in common types of windings only by means of a relatively large amount of corrective capacitance, and at considerable cost. On the other hand, any reduction in the gradient may be accompanied by a corresponding reduction in the insulation required for safety and, therefore, in the cost of the winding. A desirable arrangement is that which gives reliability for the insulation with a minimum overall cost for the transformer, including both the winding and the corrective capacitance, even though the resulting voltage gradient may not be exactly uniform throughout the winding.

A still further object of my invention, therefore, is to provide an improved arrangement for distributing in a predetermined manner a voltage suddenly impressed on a winding.

Further objects and advantages of my invention will become apparent from the following description referring to the accompanying drawings, and the features of novelty which characterize my invention will be pointed out with particularity in the claims annexed to and forming a part of this specification.

In the drawings, Fig. 1 illustrates somewhat diagrammatically a portion of a double section winding, surrounding a winding leg, which has been shielded according to the prior art; Figs. 2 and 3 show curves of initial voltage distribution along the winding of Fig. 1 without shields, shielded according to the prior art, and shielded in accordance with the present invention to give a uniform gradient; Fig. 4 is a sectional side elevation of a transformer with concentric single layer solenoidal windings which will be used in the exposition of some phases of my invention; Fig. 5 is a diagrammatic representation of the inherent capacitances associated with the high voltage winding of Fig. 4; Fig. 6 shows a capacitance network equivalent to that of Fig. 5, with corrective capacitance added; Fig. 7 shows voltage distribution curves to be used in the explanation of shielding; Fig. 8 illustrates a capacitance network similar to that illustrated in Fig. 6 except that the arrangement of the corrective capacitance is modified; Fig. 9 illustrates a fragment of a winding of an electric induction apparatus of the same type as the winding shown in Fig. 1, with diagrammatic representation of its inherent capacitance, which may be shielded according to the principles of my invention; Figs. 10, 11 and 12 show various embodiments of my invention; Figs. 13, 14 and 15 show structural details of the shielding arrangement seen in Fig. 12.

In the illustrated embodiments of my invention I have shown arrangements for substantially eliminating the voltage serrations in double section windings and for obtaining a predetermined coil-to-coil and turn-to-turn gradient throughout the winding. These means, as shown, include corrective capacitors connected from points of higher potential to the inside crossovers for neutralizing the inherent capacitance of the inside surface of the winding to adjacent surfaces of low or ground potential, the capacitors being located adjacent to the outside surface of the winding, in electrostatic coupling therewith, for shielding it or neutralizing its inherent capacitance to ground. I have also shown separate auxiliary capacitors for augmenting the corrective capacitance from the line terminal to various points in the winding. Any other suitable corrective capacitance means may be provided and associated with the winding in any suitable manner, such as being connected to the various crossovers either electrically, or electrostatically, for providing a predetermined voltage distribution throughout the winding, both between coils and between turns.

A winding is herein referred to as shielded whether its capacitances to ground are intercepted, as by shields proper, or are neutralized by corrective capacitance, and whether the corrective capacitance is due to capacitive relationship between the shields and the winding or is conductively applied from capacitors which are distinct from the winding.

Referring to the drawings, Fig. 1 shows a portion of an electric induction apparatus having a double section winding surrounding the core 20, which is grounded. The first section 21 of the winding, including a plurality of concentric turns 22, has its outside terminal 23 connected to the high voltage line terminal 24, to which a static plate 25 also is connected. The inside turn of section 21 is connected through conductor 26, which is termed an inside crossover, to the inside turn of the second section 27, which also has a number of concentric turns 22. Sections 21 and 27, which may be wound in opposite directions from the inside out, together constitute the first coil of the winding. The outside turn of section 27 connects to the outside turn of section 29, of the second coil, through an outside crossover 28, while the inside turns of sections 29 and 30, of the second coil, are connected, in turn, through another inside crossover 31. Capacitor elements 32 are shown, in accordance with past practice in shielding, to distribute the voltage along the winding stack. A grounded casing, which is outside of the winding, is indicated diagrammatically by the numeral 33.

As is described in my Patent 1,585,448, and in various other patents mentioned above, if a high voltage impulse such as results from lightning or switching strikes the terminal of a winding, the voltage will distribute itself in such a manner that the initial voltage across capacitance elements which are in series with each other are in inverse proportion with the respective capacitances. In using this principle to explore the gradient for any particular winding it is helpful to consider the dielectric field which exists in the capacitance network in two components, one axial and the other radial.

For the winding of Fig. 1, without the corrective capacitance elements 32, the voltage gradient along the winding stack is effected by the axial component of the field, corresponding to the inherent capacitance network of the winding, this component emanating from the static plate and traversing the coil-to-coil capacitance. Radial diversions from this field occur through the capacitances to ground from both the inner and the outer edges of the coils. The diversions from the inner edges are ordinarily considerably the larger. These diversions reduce the axial component and thus lower the voltages across and between coils for parts of the winding which are farther from the static plate and terminal, with consequent increases in the voltages across and between those coils which are near the terminal.

It may be explained here that the conventional static plate provides an element of corrective capacitance to the winding since, without it, the electrostatic field of the inherent capacitance network must all emanate from the terminal and the first turn, resulting in extremely high voltages between adjacent winding elements which are nearest to the terminal. Since the static plate was in general use for windings of this type previous to any knowledge of the use of corrective capacitance as here defined, it is not ordinarily included under the designation of shield. Rather, it is considered as an integral part of the winding, and the capacitance elements which it provides are considered as inherent.

The initial voltage gradient resulting with this inherent capacitance network, without the corrective capacitance, is illustrated by the curves 35 in Fig. 2 and 35' in Fig. 3.

In Fig. 3, the distance from the terminal along the winding, as measured by turns, is plotted in zig zag fashion, in accordance with the actual positions of the respective turns in the winding whereas, in Fig. 2, this distance is plotted continuously in the same direction, along the axis of abscissae. For both figures, voltage is plotted along the axis of ordinates, with the same scale, so that any horizontal line connecting corresponding curves in the two figures intersects both curves at the same turn. The voltage gradients represented by corresponding curves in the two figures are the same, those of Fig. 2 being the conventional development of those of Fig. 3. Fig. 3 is given here in order to show more clearly the potential differences or voltages existing between the various turns and sections in connection with their physical positions in the winding.

As seen in curves 35 and 35', and as has long been known, the potential gradient is steepest in the line terminal end of the winding, when no shielding is used.

When the corrective capacitances or shields 32 in Fig. 1 are applied to distribute the voltage among the coils, in accordance with past practice, while the voltages at the outside crossovers are raised, giving a more uniform initial voltage gradient along the outer surface of the winding, I have found that this greatly increases the radial field, from the outside edges of the coils inward. In this field, the capacitances between turns are in series with the capacitances from the inside edges of the coils to ground. The serrated gradient which results within the winding is illustrated by the curves 36 of Fig. 2 and 36' of Fig. 3, which correspond with the description given above for such gradients.

As previously mentioned, the thicker the turn-to-turn insulation, the smaller the capacitance between turns and, therefore, the deeper the serrations and the higher the voltage which this insulation must withstand. Curves 36 and 36' also illustrate the difficulty, which will be explained later, of supplying enough corrective capacitance by prior methods of shielding to reduce the coil-to-coil gradient, along the outside surface of the winding, as much as it should be reduced, near the line terminal.

Comparing curves 36 and 36' with 35 and 35', it will be seen that, although the coil-to-coil voltage distribution has been improved by past methods of shielding, the turn to turn voltages have been very much increased throughout the main body of the winding, as indicated by the steepness of the gradient segments within the individual sections, which constitute the intracoil serrations. Only in the first section adjacent the terminal have these turn-to-turn voltages been slightly reduced. In order to overcome or minimize these voltage serrations, which have made it necessary to use heavy turn insulation to avoid puncture, I provide suitable corrective capacitance arrangements suitably connected or associated with the inside surface of the winding, such as being connected to the inside crossovers, to raise the potentials of the inside surfaces of the coils sufficiently so that they approach values intermediate the potentials of the outside surfaces of the corresponding sections, the optimum voltage distribution being as indicated by the curves 37 in Fig. 2 and 37' in Fig. 3.

Before describing physical means for providing the corrective capacitance for securing the desired predetermined voltage gradient with respect both to turns and to coils which is particularly adapted to double section coil windings, some of the principles and methods of my invention will be explained in connection with a single layer solenoid winding.

Referring to Fig. 4, a transformer with a single layer solenoidal high voltage winding is shown, having a casing 40 which encloses a core 41 with a winding leg 42. Surrounding the winding leg is a low voltage winding 43 with terminals 44 and 45. Outside of the low voltage winding and concentric therewith is the single layer solenoidal winding 46, the first turn of which is connected to a high voltage line through terminal 47 while the last turn is connected to ground through terminal 48. Two static plates 49 and 50 are provided, the former connected to the line end of the winding and the latter to the grounded end.

Fig. 5 is a diagram of the inherent capacitance network of the high voltage winding in Fig. 4. Each $C_g'$ capacitance element represents the capacitance of a single turn of the winding to the low voltage winding (on the assumption that, from the standpoint of the high voltage winding, the entire low voltage winding may be considered as at practically ground potential), and $C_g''$ is its capacitance to the outer core legs and tank, which are grounded. These two capacitances are shown as terminating in the common ground 51, since, in effect, they are in parallel relationship with each other. We shall refer to their sum, therefore, by the single symbol $C_g$, as represented in Fig. 6. $C_c$ in Fig. 5 is the capacitance between consecutive turns of the high voltage winding.

The static plates 49 and 50 confer characteristics to the dielectric field of the winding (which is necessarily discontinuous at its two ends) approximating those of a continuous solenoid.

When a sudden voltage is applied to the high voltage terminal 47, as by a lightning stroke, its distribution along the solenoid at the first instant is non-linear, as illustrated by curve 52 of Fig. 7, in which voltage is plotted on the ordinate axis and distance along the winding on the abscissa axis. If the turn-to-turn capacitances and the turn-to-ground capacitances are uniform along the solenoid, the equation of this initial distribution, for a sheer impulse, may be expressed in terms of a transcendental mathematical function (more specifically, a hyperbolic function) of the winding constant, $\sqrt{C_g/C_c}$, and its curve is quite regular, as illustrated by curve 52. But if these capacitances are not uniform, and they are usually far from uniform in actual windings, the curve would be irregular and its equation would involve extreme mathematical difficulties. In any event, this equation would afford no guidance for determining the amount of corrective capacitance to be added to give a voltage distribution approaching the optimum shown by the straight line 53 in Fig. 7. However, I have found a method of calculating, by simple algebraic means, the values of corrective capacitance for securing any desired voltage distribution, for any given distribution of the inherent turn-to-turn and turn-to-ground capacitances.

In the equivalent capacitance network with corrective capacitance elements added, as shown in Fig. 6, $C_{c,n}$ is the inherent capacitance from the $n$th turn, counting from the grounded end of the winding, to the $(n+1)$th turn, and $C_{g,n}$ is the total capacitance, $C_{g',n}+C_{g'',n}$, from the $n$th turn to ground. $C_{s,n}$ is the corrective capacitance which must be added, in parallel with $C_{c,n}$, in order to adjust the initial impulse voltage across turn $n$ to correspond with the desired distribution throughout the winding. Then, whether $C_{c,n}$ and $C_{g,n}$ are uniform for different values of $n$ throughout the winding, or vary from turn-to-turn, in order to obtain any desired voltage distribution such, for instance, as those shown by curves 53 or 54 of Fig. 7, it is only necessary that each corrective capacitance shall satisfy the equation:

$$(EC)_{s,n} = (EC)_{g,n} + (EC)_{c,n-1} + (EC)_{s,n-1} - (EC)_{c,n} \quad (1)$$

The voltages represented by the various E values in this equation are those across the capacitances with which they are associated, in the desired distribution.

For uniform voltage distribution and equality of the $C_c$ capacitance elements, the terms containing $C_c$ in Equation 1 cancel each other and the equation takes the simpler form:

$$(EC)_{s,n} = (EC)_{g,n} + (EC)_{s,n-1} \quad (1A)$$

In order to calculate $C_{s,n}$ by these equations, it is necessary that $C_{s,n-1}$ should be known. This is known at first, for only one value of $n$, namely, the lowest value for which corrective capacitance is applied, where it is zero. After calculating $C_{s,n}$ for this value of $n$, it may be substituted as $C_{s,n-1}$ in calculating $C_{s,n}$ for the next higher value of $n$. Thus all of the corrective capacitance elements may be calculated successively, the value of $n$ increasing in steps of unity.

When desirable for any reason, arrangements of corrective capacitance elements may be used which are more complicated than that shown in Fig. 6. For such cases, with any number, $k$, of these elements, supplying or receiving charging current at turn $n$ (see Fig. 8), the following equations may be used in place of (1) and (1A):

$$[(EC)_1 + \ldots + (EC)_k]_{s,n} = (EC)_{g,n} + (EC)_{c,n-1} - (EC)_{c,n} \quad (2)$$

$$[(EC)_1 + \ldots + (EC)_k]_{s,n} = (EC)_{g,n} \quad (2A)$$

The terms in the left-hand members of these equations correspond with the respective corrective capacitances, with positive values for the elements supplying charging current and negative values for those receiving it.

Equations 2 and 2A can be used for the calculation of only one of the corrective capacitance elements $l$ to $k$, of course, when the values of all the others are known, or assumed. If, as before, our calculations at the smallest value of $n$ for which corrective capacitance is applied, and continue with consecutively higher values, the elements with negative voltages, in each case, will have been previously evaluated, and convenient values may be assigned to all but one of the elements with positive voltages. The remaining corrective capacitance element, in each case, can then be calculated. Thus, for the turn $n$ in Fig. 8, for instance, the values of $C_{s,1}$ and $C_{s,2}$ will have been determined in connection with lower values of $n$, and any convenient value may be assigned to $C_{s,3}$. Then $C_{s,4}$ (where $k=4$) may be calculated. In this case it might be convenient to choose zero as the value of $C_{s,3}$.

If the inherent capacitance of the winding and (or) the corrective capacitance are continuously distributed, the capacitance values appearing in the foregoing equations are to be interpreted as the effective values of the respective kinds of capacitance at the points considered.

The principles and methods evolved above for the single layer solenoid will now be extended to double section windings of the type seen in Fig. 1. Fig. 9 shows, in greater detail, a portion of such a winding, in which the first coil includes sections 60 and 61, connected by an inside cross-over 62. The outside turn of section 60 connects to a high voltage line or to a coil next higher in the winding, through the conductor 63. The next lower coil includes sections 64 and 65, connected together by the inside cross-over 66, and the two coils are connected by an outside cross-over 67 between sections 61 and 64.

When such a winding is shielded in accordance with past practice, the shields, located outside the winding and connected to the line terminal, or being in capacitive relation with the terminal such that they are of higher potential than the winding portions which they shield, intercept at least a portion of the outside capacitance to ground, and provide corrective capacitance elements between the shields and the outside edges of the sections for neutralizing any additional ground capacitance which is effective here. Both the ground capacitance and the corrective capacitance may be considered as concentrated at the outside crossovers.

The ground capacitance effective at each outside crossover, without shields, includes the outside capacitances of the two sections which are connected by it, plus a capacitance which includes the capacitance from outside turn to inside turn in series with the inside capacitance to ground of each of the same two sections. As represented in Fig. 9, let $C_g'$ and $C_g''$ be respectively inside and outside capacitances to ground, each from two sections, while each $C_t$'s represents the capacitance between the outside and inside turns of a single section. Then, although the two $C_t$ elements which start from a single $C_g''$ element go not to the same $C_g'$ element, but to adjacent ones, for the total ground capacitance effective at the outside crossover we may, with sufficient approximation, write:

$$C_g = \frac{2C_t \times C_g'}{2C_t + C_g'} + C_g'' \quad (3)$$

This value, therefore, may be used in Equation 1A or 2A for calculating the corrective capacitance elements which, applied to the outside crossovers, will maintain the potentials of these points in approximate alignment with the desired voltage gradient.

The use of the more complex Equations 1 and 2 may not be necessary, since the difference between the positive and negative terms which are omitted in Equations 1A and 2A, when they are not equal, is very small as compared with the sum of the terms which are retained. This is fortunate, since the value of $C_c$ which is effective between outside crossovers as indicated in Fig. 9, and which appears in Equations 1 and 2, varies in a complex manner with independent variations in $E_c$, $C_t$ and the capacitance between adjacent sections, considered as disconnected solid plates.

In past practice, in order to obtain maximum corrective capacitance between the shields and the outer edges of coils near the terminal without blocking the flow of cooling fluid through the ducts between sections, "rib shields" have been used, the ribs consisting of insulated metal strips bound as closely as possible to the edges of the sections. However, the capacitance obtained in this way still was too small, in many cases, and if the resulting voltage between the edge of the section and the rib was too high for safety with a given thickness of insulation, the only way to improve the safety factor was to thicken the insulation. But this made the capacitance still smaller, not only because of the increased thickness of the dielectric, but also on account of the necessary reduction in the width of the rib in order not to obstruct the duct. This would result in still higher voltage so that, as with the insulation between turns for resisting the voltage set up by the serrations, thickening the insulation is a very inefficient way of improving the safety factor.

Physical constructions for eliminating the intra-coil voltage serrations, and for providing sufficient corrective capacitance to give the desired gradient near the terminal, and throughout the winding, all in accordance with my invention, will now be described.

In Fig. 10 I have illustrated a portion of an electrical induction apparatus, as a transformer, which has a low voltage winding illustrated diagrammatically by the rectangle 70. It is to be understood that the low voltage winding surrounds a leg of a core, which is not shown. Surrounding the low voltage winding is a high voltage winding, indicated generally by the numeral 71, which includes a plurality of double section coils. A suitable line conductor 72 connects with a first section 73 of the high voltage winding 71 through a conventional static plate 74. The connection between the static plate 74 and the section 73 is made through a conductor 75 which connects to the inside turn of section 73. The reason for connecting to the inside turn instead of to the outside turn will be explained below.

It is to be understood that section 73, and all of the other sections of winding 71, are made up of spirally wound conductors, thus providing a plurality of turns in each section, as illustrated in Fig. 9.

The outside turn of section 73 is connected with the outside turn of the adjacent section 76 by an outside crossover 77, and the inside turn of the section 76 is connected to the inside turn of a section 78 by an inside crossover 79. Thus, a winding with a plurality of series connected double section coils is provided, extending from the line terminal 72 to a terminal 80, through a static plate 81, which is located at the opposite end of the winding from static plate 74. Terminal 80 may be a neutral terminal, with the winding all on a single winding leg, or it may be connected to another winding portion, in series with 71, either on the same leg or on another winding leg.

It is to be understood that the line terminal 72 is at the middle of the winding stack, as is conventional in high voltage transformers, and that another winding similar to 71, and connected in parallel with it, extends below the static plate 74 in Fig. 10.

In order to provide a linear distribution of electrostatic voltage, or any other desired distribution, when an impulse strikes the winding through the line terminal 72, and also to prevent the serrations which were described in detail in connection with Figs. 2 and 3, I provide a shielding arrangement which includes corrective capacitances in the form of several groups of series connected rib capacitors, the first group being indicated generally by the numeral 82. These rib capacitor groups may be supplemented by an auxiliary capacitor arrangement generally indicated by the numeral 83. All capacitors are electrically connected to inside crossovers, and the rib capacitors are electrostatically connected with the outside surfaces of the respective coils.

The first rib capacitor 84 in the group of capacitors 82 has its outside plate (rib) 85 connected to the line terminal 72 through the conductor 86. The inside plate 87 is connected to the inside crossover 79 through a conductor 88, and to the outside plate of the second rib capacitor 89. The inside plate of this second capacitor is connected in turn to the second inside crossover and to the outside plate of the third capacitor. Thus rib capacitors are connected in series and to consecutive inside crossovers for any desired number of coils, four being shown for group 82 in Fig. 10.

In any group of rib capacitors in arrangements such as are here used, each capacitor supplies charging current for the inherent capacitance of one inside crossover to ground, and for the next capacitor in its group, toward the neutral terminal. For the capacitor at the end of the group nearest to the neutral, the required capacitance is small, but it increases rapidly toward the the line terminal. When this capacitance exceeds that which can be obtained with two ribs, it is possible to increase the number of ribs as illustrated in the modification shown in Fig. 11. The maximum capacitance which can be obtained with two ribs may be doubled with three, and trebled with four, etc. When sufficient capacitance is obtained in this manner, it is possible to provide the amount of shielding needed for a given winding by a single group of multi rib capacitors, as illustrated in Fig. 11, without the use of an auxiliary capacitor arrangement such as that shown in Fig. 10. However, it may be more economical to limit the number of ribs in a single rib capacitor to two, and to provide the necessary additional corrective capacitance by means of an auxiliary capacitor.

Any suitable auxiliary capacitor construction may be used. In the series arrangement shown in Fig. 10, each capacitance of the series supplies charging current for the capacitance to ground of one inside crossover, intermediate those supplied by adjacent groups of the series connected rib capacitors, and also for the rib capacitors next beyond this crossover, as well as for the next auxiliary capacitance of the series, toward the neutral.

It will be seen that in the auxiliary series capacitor construction shown in Fig. 10 I have provided a conductive tubular member 90, which is to be connected to the line terminal through a conductor 91, to form one plate of the first capacitance of the series. The tubular member 90 is contained inside an insulating cylinder 92 and is connected to the conductor 91 by a metal dome 93 with a tubular portion 94 which is forced into the end of the conducting cylinder 90. In this manner electrical connection is made between the dome 93 and the upper end of the plate 90. The conductor 91 is connected to the dome 93 in any suitable manner such as by soldering, as is indicated by the numeral 95. The insulating cylinder 92 may be formed in any suitable manner such as by a plurality of cylindrical portions. Thus a suitable amount of insulation 96 is provided around the conducting cylinder 90 by winding flexible insulation such as paper to the required thickness. A conducting coating 97 is then applied around the insulating layer 96 to provide the other plate of the first capacitance of the series. It will be seen that the second plate 97 of this first capacitance is connected through a conductor 99 and a single rib 100 to an inside crossover 98 of one of the double section coils, just beyond the coils to which the rib capacitors of the first group 82 are connected.

It will be seen, further, that the conducting coating 97 forms the first plate of the second capacitance of the series. Another layer of insulation 101 is wound over plate 97, followed by another conducting layer 102, which forms the second plate of this second capacitance. The plate 102, in turn, is connected, through a conductor 103 and a single rib 104, to an inside crossover 105 of the double section coil just beyond the coils to which the second group of rib capacitors are connected. A third capacitance is formed in similar manner and its second plate 106 is connected to the inside crossover 107 of the coil just beyond those to which the third group of rib capacitors are connected, and this provision of auxiliary capacitors may be continued if necessary, until the corrective capacitance needed by the remaining coils toward the neutral can be supplied by a single group of rib capacitors.

It will be noted that the length of the conductive layers forming the plates of the auxiliary capacitor structure are shorter for the capacitances which are connected across coil groups which are nearer the neutral end of the winding. This is due in part to the fact that less corrective capacitance is needed here, and in part it is because with the larger diameters involved, the same amount of capacitance, with the same thickness of dielectric between plates, would require shorter plates. It will be understood that the capacitances may be varied as required by varying the area of the capacitor plates, or the thickness of the dielectric between the plates. The latter must, of course, be sufficient to withstand the voltage involved.

For the most economical design of the auxiliary capacitor structure shown in Fig. 10, the diameter of the line plate 90 would be just sufficient to provide the required corrective capacitance with full extension of plate 97 and only the thickness of the dielectric layer 96 which is necessary to withstand the voltage between plates 90 and 97. These plates can be continuous, for the winding shown in Fig. 10 and the winding below the static plate 74, which is not shown.

In Fig. 11, where I have illustrated an arrangement for obtaining sufficient capacitance by the use of a plurality of ribs, a portion of a winding 110 is shown, which winding is formed of a plurality of serially connected double section coils of the type as that shown in Figs. 1 and 10. A line terminal 111 is connected through a static plate 112 to the inside turn of a first coil section 113, the outside turn of which is connected through an outside crossover 114 to the outside turn of a coil section 115. The first corrective capacitance is provided by a rib capacitor 116, having a plurality of ribs, one plate of which is connected to the line terminal 111 through a conductor 117. The other plate, including the inner rib, of capacitor 116 is connected to the inside crossover 118, which connects the inside turn of section 115 to the inside turn of the next coil section 119. As will be seen in the drawings, additional rib capacitors are provided, in series with each other, which are connected consecutively to inside crossovers.

The construction as shown in Fig. 11 is particularly adapted for relatively low voltage windings, where the line terminal and its connecting static plate are at one end of the winding stack instead of at the middle, as shown in Fig. 10, and where the corrective capacitances needed are relatively small.

In the arrangements shown in Figs. 10 and 11, with sufficient amounts of corrective capacitance obtained between opposed rib surfaces or with auxiliary capacitors, the ribs can be spaced away from the section edges instead of having to be bound to them as closely as possible, as was necessary in past shielding practice. This facilitates cooling, and makes it possible to use ribs which are much wider than in the past. Thus, the ribs of Figs. 10 and 11 extend over the thickness of two adjacent sections and the intervening duct, whereas the ribs previously used, with their insulation covering, were restricted to the thickness of a single section. This increased width provides more capacitance which, in contrast with the conditions previously described for the rib shields, reduces the voltage and makes it possible to reduce the thickness of the insulation. And thinner dielectric increases the capacitance still further or, if this is not desired, it makes it possible to reduce the area of the plates, as by reducing the circumferential extension of the ribs.

It will be seen that with the arrangements of shielding shown in Figs. 10 and 11 the necessary corrective capacitances may be provided to charge the inherent capacitances to ground of the various inside crossovers to potentials which will align themselves on any desired voltage gradient. Moreover, if the circumferential extension of the ribs is approximately complete, it is seen that the outer edges of the sections are shielded from ground, and, with the ribs located as shown in the figures, the potential of each outside crossover will be affected substantially equally by the capacitances of two ribs which are connected respectively to the nearest inside crossovers, one toward the line terminal and the other toward the neutral. The potential of the outside crossovers will therefore be intermediate the potentials of these inside crossovers. Thus the outside crossovers also will align themselves on the desired gradient, and the voltage serrations will be eliminated.

If the circumferential extensions of the ribs in Figs. 10 and 11 are not complete, any outside ground capacitance reaching the coils may be neutralized, giving the same voltage gradient as before, by shifting the ribs slightly toward the neutral terminal, thus bringing the outside crossover more strongly under the influence of the rib of higher potential.

It has been seen that, with my improved shielding arrangements, the corrective capacitance for the inside edges of the coils is supplied conductively from the rib capacitors or the external capacitors, instead of from capacitance between the shields and the outer edges of the coils in series with the turn-to-turn capacitance within the sections. Also, with the outside edges of the coils largely if not completely shielded from ground by the corrective capacitors, the amount of corrective capacitance needed for the outside edges is at most very small. Thus, the shielding is not appreciably affected by increasing the spacing between the capacitors and the outer surface of the winding. Also, the capacitance occurring between an outside crossover and a rib or conductive layer of the capacitor structure which is connected to the next inside crossover toward the neutral end of the winding is neutralized or corrected by capacitance to a similar rib or conductive layer which is connected to the next inside crossover toward the terminal end. If the corrective capacitors do not extend all the way around the winding, so that a small amount of ground capacitance does become effective at the outside crossover, this can be corrected by shifting the capacitor structure somewhat toward the neutral end of the winding, so that the capacitance of the outside crossover to ribs or conductive layers of higher potential is increased, and to those of lower potential reduced.

With the corrective capacitances applied directly to the inside crossovers, the $C_t$ capacitance elements are no longer in series with the inside ground capacitances, and the total capacitance to ground effective at the inside crossover, for use in Equation 1A or 2A is $$C_g = C_g' + C_g'' \quad (4)$$

instead of the value given by Equation 3. The outside capacitance elements $C_g''$ are transferred to the inside crossovers conductively, either having been intercepted by a rib or having come to it by capacitance from the outer edge of the section. Single ribs are provided for this purpose for those coils which have no rib capacitors, as is shown in Fig. 10 by the numerals 100 and 104.

It has been noted that the line terminal and static plate, in Figs. 10 and 11, are connected to the inside turns of adjacent sections instead of to the outside turns, as has been the previous practice in shielded windings. The reason for this is that with the first corrective capacitance connected from the terminal to the first inside crossover, in accordance with the present invention, the voltage of two sections appears across it instead of the voltage of a single section, as would be the case if the outside turn of the first section were connected to the terminal. Since the charging current which flows through the capacitor is equal to the product of its capacitance by the voltage across it, the result is that, in order to charge the capacitance to ground of the first inside crossover to the desired potential, the corrective capacitance needed is reduced by one-half. This is the more important since the corrective capacitance near the terminal must in any event be relatively large.

In Fig. 12, I have illustrated a modification of my invention which includes corrective capacitances provided by a set of overlapping conical plates in series capacitive relationship with each other and connected consecutively to the inside crossovers of a double section winding similar to that shown in Fig. 10. The increasing values of capacitance which are required in progressing from the end of the shielding structure which is nearer the neutral, toward the line terminal, which is obtained by the auxiliary capacitance in Fig. 10, and by the increasing numbers of ribs in individual capacitors in Fig. 11, is here obtained by increasing the overlappage of consecutive plates. The circumferential extension of the plates may be practically complete, thus fully shielding the outside edges of the sections from capacitance to ground, and the necessary overlappage will start from a very small value at the end toward neutral and will increase progressively to a considerable amount at the terminal end.

The transformer shown in Fig. 12 includes a low voltage winding with two parallel connected coils 120 and 121, each of which may surround a separate core leg. Coil 121, on what is called the line leg, is surrounded by two parallel connected portions of double section high voltage windings, one portion 122 above and the other portion 123 below a line terminal 124 and static plate 125. The line terminal connects to the static plate which, in turn, connects to the inside turn of a coil section 126 in winding portion 122, which progresses upward to the top of the winding stack where it connects to a static plate 127. In like manner the static plate 125 connects to the inside turn of a section 128 in the winding portion 123, which progresses downwardly to the bottom of the winding stack where it connects to a static plate 129.

In similar manner, low voltage winding 120, on what may be called the ground leg of the transformer, is surrounded by two other parallel connected portions 130 and 131 of the high voltage windings. A static plate 132 at the middle of this winding stack connects to the outside turn of a coil section 133 in winding portion 130 which progresses upwardly to the top of the winding stack to a neutral terminal 134. The static plate 132 also connects to the outside turn of a section 135 in the winding portion 131, which progresses downwardly to the bottom of the winding stack to a neutral terminal 136. The two static plates 127 and 129 at the top and bottom ends respectively of the line winding stack are connected through conductors 137 and 138 respectively to static plate 132 at the middle of the ground stack, thus placing the two parallel windings 122 and 123 in series with the two parallel windings 130 and 131.

The major insulation, between the high voltage and the low voltage windings in Fig. 12, is what is termed graded insulation, with four cylindrical insulating barriers 140 in the middle portion of the line leg, where the line end of the high voltage winding is located. The outer cylinder of the group 140 extends only about half of the length of the winding stack, and is supported by the flanged collars 141, leaving three cylinders extending beyond the ends of the stack. The middle portion of the ground leg is insulated by only two cylinders 142, one extending approximately one half of the length of the stack and supported by the flanged collars 143, and the other extending beyond the ends of the stack.

Corresponding with the tapering of the insulation, the coil stacks themselves are tapered, with maximum diameters at the middle of the stacks, the diameters being reduced in several small steps toward the ends of the stacks. This tapering of the major insulation and the winding stacks is made to contribute to the effectiveness of cooling of the winding as will be pointed out here.

A cylinder 145, surrounding the line leg, is utilized for supporting the overlapping conical plates of the capacitor structure, which are mounted on it as described below. However, it will be observed that this cylinder has straight sides, leaving tapered spaces between it and the coils, which are maximum at the ends of the stack and which are entirely closed at the middle. It will also be observed that the space inside of the winding tapers in the opposite directions, being closed at the ends of the stack and maximum at the middle. And it will be seen that the combined effect of these tapered spaces is most favorable to the effective flow of the cooling fluid which, as indicated by the arrows, enters the space outside of the windings at the bottom and is forced to traverse inwardly through the horizontal ducts between the sections as it passes upwardly to the middle of the stack, where it is all on the inside. From this point to the top of the stack, the cooling fluid is forced to flow through the horizontal ducts outwardly. Thus, the circulation of the cooling fluid is made more effective for the large horizontal surfaces of the sections.

My improved shielding arrangement, shown somewhat diagrammatically in Fig. 12, will be described in further detail in relation to Figs. 13, 14 and 15. Referring to Fig. 12, a first plate 150, at the middle of the stack, is connected directly to the line terminal 124 and through it and the static plate 125 to the inside turns of 126 and 128 which constitute the first sections of the two parallel winding portions, 122 and 123 respectively. This plate tapers outwardly from the middle in both directions, up and down, and it is the first plate of each of the two series of plates for the respective winding portions. The second plate in each series connects to the first inside crossover away from the terminal, the third plate to the second inside crossover, etc.

Fig. 13 is a perspective view, partly in section, taken at any suitable point in the high voltage winding portion 122, as at 152 in Fig. 12, showing a practical embodiment of my improved conical plate corrective capacitance structure. This structure is mounted on a foundation cylinder 145, which is separated from the outer surface of the winding by a plurality of tapered spacers 153, with a stepped construction (not shown), so as to hold the cylinder concentric with the coils. The adjacent overlapping conical plates or shields are separated from each other by insulating layers. Thus, shields 155 and 156 are separated by the insulating layer 157, and 156 is separated from 160 by the insulating layer 159. The outer edges of the insulating layers are folded over the outer edges of surrounding shields, as 159 over 160. Also, each of the shields is provided with a lead, as 158 with 161.

To form such a capacitor structure, the various shields with their insulating layers may be assembled on the cylinder 145 before it is attached to the winding. The cylinder may have a longitudinal break, as indicated between the edges 166 and 167. The space between these two edges may be bridged by a panel 168. This panel, which may be attached to the winding before the cylinder is attached, has a plurality of holes indicated by the numeral 169, through which lead conductors 170 may pass, from the inside crossovers. The outer ends of these leads may be attached to the panel 168 by terminal screws 171. After all of these leads have been brought out through their respective holes and attached to the panel the cylinder 145 may be placed around the winding portions 122 and 123 and fastened in place by the screws 172, which are threaded into the edges of the panel 168. The shields may then be connected to their respective inside crossovers by attaching their leads to the terminals to which the leads from the crossovers are connected. Thus shield 158 is connected to its inside crossover through leads 173 and 170, which are connected together by terminal screw 171.

In order that the leads from adjacent shields, such as leads 161 and 173, may be better spaced from each other, it will be noted that they project onto the panel 168 from opposite sides. It will also be noted that the lead 170, which connects with the inside crossover, from coil 152, is shown as passing through a coil spacer 178, although this is not necessary from the standpoint of insulation.

Although I have shown and described particular embodiments of my invention, I desire not to be limited to these particular embodiments and I intend, in the appended claims, to cover all modifications which do not depart from the spirit and scope of my invention.

What I claim as new and desire to secure by Letters Patent of the United States is:

1. An electromagnetic induction apparatus including a high voltage winding having a plurality of winding elements arranged in a linear sequence, each winding element having a plurality of turns arranged in a direction generally at right angles to the direction of said sequence of winding elements, each of said winding elements having inherent electrostatic capacitances between turns and to adjacent elements, said winding elements also having inherent electrostatic capacitances to surfaces of different potential both inside and outside of said elements, and corrective capacitance network means associated respectively conductively and electrostatically with said opposite sides of said elements and proportioned in relation to said inherent capacitances to secure a predetermined voltage distribution throughout the volume of said winding when a potential difference is suddenly impressed on the winding.

2. In an electric induction apparatus, a winding, said winding having inherent capacitance from each side thereof to surfaces of different potential, and means for providing a predetermined initial distribution of a voltage suddenly impressed on said winding, said means including capacitive means adjacent to and wholly on one side of said winding for substantially affecting the inherent capacitance on said one side of said winding, and means for conductively connecting said capacitive means to the other side of said winding for affecting the inherent capacitance on said other side of said winding.

3. In an electric induction apparatus, a winding, said winding having inherent capacitance from each side thereof to adjacent surfaces of different potentials, and electrostatic shielding means for said winding including capacitive means conductively and electrostatically connected respectively to opposite sides of said winding for substantially supplementing said inherent capacitances so as to effect a predetermined distribution of a voltage suddenly impressed on said winding.

4. In an electric induction apparatus, a winding, said winding having inherent capacitance from each side thereof to adjacent surfaces of different potential, and electrostatic shielding means for said winding including conductive means electrostatically coupled to one side of said winding and electrically connected to the other side of said winding for substantially affecting said inherent capacitance on said one side and for substantially supplementing it on said other side so as to effect a predetermined distribution of a voltage suddenly impressed on said winding.

5. In an electric induction apparatus, a winding having a plurality of coils connected in series, each of said coils having a plurality of turns, and electrostatic corrective means for said winding including capacitive means wholly located outside said winding and associated electrostatically and conductively respectively with opposite sides of said winding to cooperate with the inherent capacitances between both sides of said winding and surfaces of different potentials and the inherent capacitances between turns, thereby effecting a predetermined distribution of a voltage suddenly impressed on said winding.

6. In an electric induction apparatus, a winding having a plurality of disk sections, each of said sections comprising a plurality of concentric turns, internal and external crossovers for connecting said sections in series, and capacitive means electrostatically coupled with the outside surfaces of said sections and conductively connected to said inside crossovers for substantially affecting the inherent capacitance network of said winding and thereby effecting a predetermined distribution of a voltage suddenly impressed on said winding.

7. In an electric induction apparatus, a winding having a plurality of disk sections, each of said sections comprising a plurality of concentric turns, internal and external crossovers for connecting said sections in series, and electrostatic shielding means including capacitive means outside said sections and electrically connected to said inside crossovers for substantially affecting the capacitances of said winding and thereby effecting a predetermined distribution of a voltage suddenly impressed on said winding.

8. In an electric induction apparatus, a winding, said winding having inherent capacitance from each side thereof to surfaces of different potential, and means for providing a predetermined distribution of a voltage suddenly impressed on said winding, said means including a plurality of rib capacitor elements disposed along the outside surface of said winding, said rib capacitor elements being connected consecutively to spaced points on the inside surface of said winding, and auxiliary capacitor means having a plurality of conductive elements, said conductive elements also being connected to spaced points on the inside surface of said winding to provide capacitance in addition to that provided by the rib capacitors.

9. In an electric induction apparatus, a winding having inherent capacitance from each side thereof to surfaces of different potential, and means for providing a predetermined distribution of a voltage suddenly impressed on said winding, said means including a plurality of axially disposed overlapping conically shaped conductive members around said winding, said conductive members being connected consecutively to spaced points on said winding.

10. In an electric induction apparatus, a winding having inherent capacitance to surfaces of different potential, and means for providing a predetermined distribution of a voltage suddenly impressed on said winding, said means including a plurality of axially disposed overlapping conically shaped conductive members around said winding, said conductive members being connected in consecutive order to spaced points on the inside surfaces of said winding.

11. In an electric induction apparatus, a winding having inherent capacitance from each side thereof to surfaces of different potential, a cylinder surrounding said winding, means for providing a predetermined initial distribution of a voltage suddenly impressed on said winding, said means including a plurality of axially disposed overlapping conically shaped conductive members surrounding said winding and mounted on said cylinder, and means for connecting said conductive members to spaced points on said winding.

12. In an electric induction apparatus, a winding having inherent capacitance from each side thereof to surfaces of different potential, means for providing a predetermined distribution of a voltage suddenly impressed on said winding, a cylinder having an axial discontinuity surrounding said winding, corrective capacitance means mounted on said cylinder, connector means connected to spaced points on said winding, panel means bridging the axial discontinuity of said cylinder, and means on said panel for removably connecting said connector means to said corrective capacitance means.

13. A removable corrective capacitance structure for a winding of an electrical induction apparatus including an insulating cylinder adapted to be placed around the winding, corrective capacitance means mounted on said cylinder, and connector means integral with said corrective capacitance means and adapted to be connected to the winding.

14. An electrostatic induction apparatus including a high voltage winding having a plurality of winding elements arranged in a linear sequence, each winding element having a plurality of turns arranged in a direction generally at right angles to the direction of said sequence of winding elements, each of said winding elements having inherent electrostatic capacitances between turns and to adjacent elements, said winding elements also having inherent electrostatic capacitances to surfaces of different potential both inside and outside of said elements, and corrective capacitance network means associated with said opposite sides of said winding elements and proportioned in relation to said inherent capacitances to secure a predetermined voltage distribution throughout the volume of said winding when a potential difference is suddenly impressed on the winding, said capacitance network means being determined by the following equation:

$$[(EC)_1 + \ldots + (EC)_k]_{s,n} = (EC)_{g,n}$$

where the terms on the left-hand side correspond to the various corrective capacitance elements 1 to $k$ respectively which supply or receive charging current at winding element $n$, with positive values for the capacitance elements supplying charging current and negative values for those receiving it, where the right-hand member corresponds to the total capacitance from the $n$th winding element to ground, and where the values of E in the various terms are the voltages across the respective capacitance elements, which correspond with said predetermined voltage distribution.

15. In an electric induction apparatus, a winding having a plurality of disk coil sections, each of said coil sections comprising a plurality of concentric turns, means for connecting a first coil section to a second coil section including an outside crossover connected to the outer turns of said coil sections, means for connecting said second coil section to a third coil section including an internal crossover connected to the inner turns of said second and third coil sections, a line lead connected to the inner turn of said first coil section, and electrostatic shielding means conductively connected from said line lead and to said internal crossover.

16. In an electric induction apparatus including a plurality of axially disposed disk coil sections, means spacing said coils providing radially extending ducts, insulating cylinders adjacent the inside and outside surfaces of said coils, shielding means carried by one of said cylinders, said coils being spaced within said cylinders with the coils adjacent the ends of said cylinders radially spaced nearer one of said cylinders than the other of said cylinders and the coils near the center of said cylinders radially spaced nearer the other of said cylinders so that a cooling fluid entering the coil space at one end of said cylinders will traverse said radially extending ducts in passing to the other end of the coil space between said cylinders.

17. An electromagnetic induction apparatus including a high voltage winding with a plurality of series connected winding elements arranged in sequence along the axis of said winding, each winding element including a plurality of turns in radial succession, each of said winding elements having inherent electrostatic capacitance to adjacent elements and to low potential surfaces, and a capacitance network located wholly outside said winding and conductively and electrostatically connected thereto, said network being proportioned in relation to said inherent capacitances so as to secure a substantially linear voltage distribution throughout said winding of a suddenly impressed potential difference.

18. In an electric induction apparatus, a winding having inherent capacitance from each side thereof to adjacent surfaces of different potential, and means for effecting a predetermined distribution within said winding of a suddenly impressed voltage, said means including conductive surfaces in series capacitive relationship with each other and distributively coupled electrostatically with one side of said winding and distributively connected conductively to the other side of said winding.

19. In an electric induction apparatus, a winding with a plurality of coil sections, each section comprising a plurality of concentric turns, adjacent sections progressing in opposite directions from inside out and being connected in series by alternating inside and outside crossovers, and corrective capacitance means for supplementing the inherent capacitances of said winding to effect a predetermined distribution of a suddenly impressed voltage, said corrective capacitance means being electrostatically coupled with the outside surface of said winding and conductively connected in distributive manner to the inside crossovers.

20. In an electric induction apparatus including a plurality of axially disposed disk coil sections, means axially spacing said coils for providing radially extending ducts, means including an insulating cylinder adjacent the inside surfaces of said coils, means including shielding capacitance adjacent the outside surfaces of said coils, the inner surfaces of said coils being spaced unequally from said cylinder so that a cooling fluid entering the coil space at one end will traverse said radially extending ducts in passing to the other end of said coil space.

21. In combination, a generally cylindrical electrical winding having high and low voltage terminals relative to ground, an insulating cylinder surrounding said winding and separated therefrom by spacers so as to provide a cooling duct therebetween, and a plurality of nested insulated conical conducting members mounted on the outside of said cylinder, said members being coupled respectively to progressively different voltage points in said winding, the area of overlap of said nested conical members being generally proportional to the voltage of the respective winding points to which they are coupled.

22. In combination, a generally cylindrical electrical winding having high and low voltage terminals relative to ground, said winding being composed of a plurality of axially disposed disk coils, an insulating cylinder surrounding said winding, a plurality of nested insulated conical conducting members mounted on the outside of said insulating cylinder, and connectors for conductively connecting said members respectively to progressively different voltage points on the inner radial surface of said winding, said nested conical members being generally proportional in area to the voltage of the respective winding points to which they are connected.

23. In combination, a generally cylindrical electrical winding composed of a plurality of axially disposed disk coils, a plurality of axially separated rib capacitors surrounding said winding, said capacitors being radially spaced from said coils so as to provide duct space therebetween, said rib capacitors each extending axially over a plurality of adjacent disk coils, said rib capacitors each comprising a plurality of radially superposed insulated conducting bands, and means for connecting said rib capacitors to progressively different points in said winding.

JAMES M. WEED.